United States Patent [19]

McNaughton

[11] Patent Number: 4,927,185
[45] Date of Patent: May 22, 1990

[54] RELEASE TOOL FOR FLUID QUICK CONNECTORS

[75] Inventor: James McNaughton, Rochester, Mich.

[73] Assignee: Huron Products Corporation, Mt. Clemens, Mich.

[21] Appl. No.: 319,960

[22] Filed: Mar. 7, 1989

[51] Int. Cl.⁵ .............................................. F16L 35/00
[52] U.S. Cl. ..................................... 285/39; 285/308; 285/319; 285/921
[58] Field of Search ................ 285/39, 308, 319, 320, 285/903, 921; 44/433, 432

[56] References Cited

U.S. PATENT DOCUMENTS

| | | |
|---|---|---|
| 3,299,496 | 1/1967 | Christensen . |
| 3,680,893 | 8/1972 | Giraud . |
| 3,711,632 | 1/1973 | Ghirardi ............................. 285/903 |
| 4,055,359 | 10/1977 | McWethy ............................. 285/39 |
| 4,108,474 | 8/1978 | Sigrist . |
| 4,159,132 | 6/1979 | Hitz . |
| 4,189,817 | 2/1980 | Moebius . |
| 4,257,135 | 3/1981 | Moebius . |
| 4,657,458 | 4/1987 | Woller et al. ....................... 411/433 |
| 4,728,076 | 3/1988 | Ganshorn et al. . |
| 4,749,214 | 6/1988 | Hoskins et al. . |
| 4,756,558 | 7/1988 | Beamer . |
| 4,769,889 | 9/1988 | Landman et al. . |
| 4,781,400 | 11/1988 | Cunningham . |
| 4,795,197 | 1/1989 | Kaminski et al. ................... 285/903 |
| 4,842,309 | 6/1989 | LaVene et al. ..................... 285/921 |

*Primary Examiner*—Dave W. Arola
*Attorney, Agent, or Firm*—Harness, Dickey & Pierce

[57] ABSTRACT

A connector release tool includes a pair of substantially identical members. The members are connected with one another such that they are movable to oppose one another to form a cylindrical portion. The members also include an exterior surface for enabling manual manipulation of the members. The mechanism is coupled with the members for releasably locking the members together to form the cylindrical portion.

12 Claims, 1 Drawing Sheet

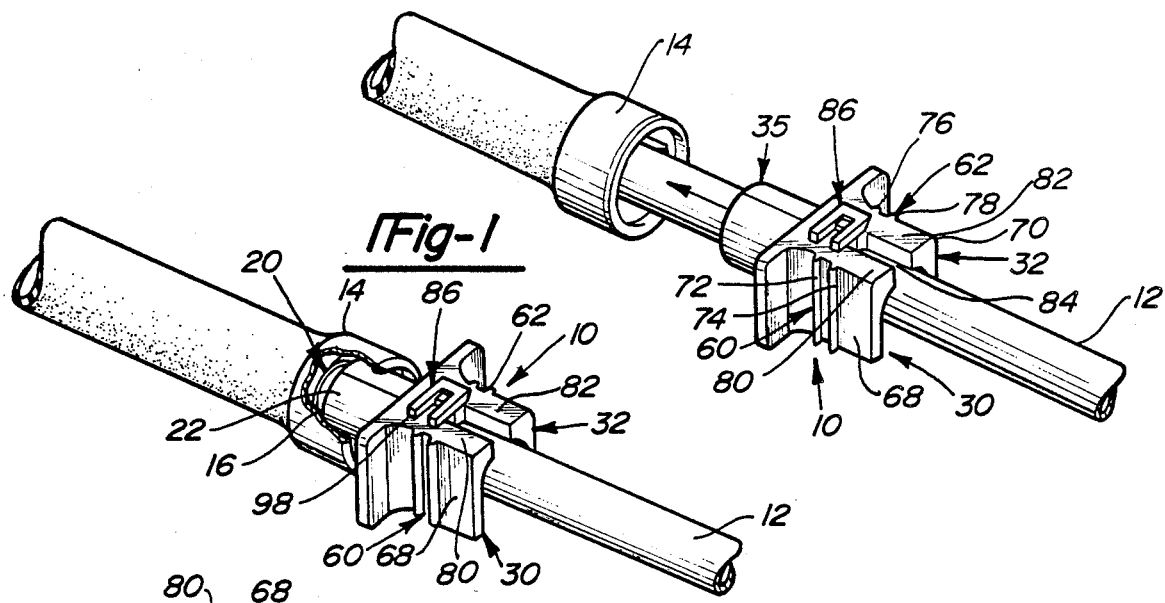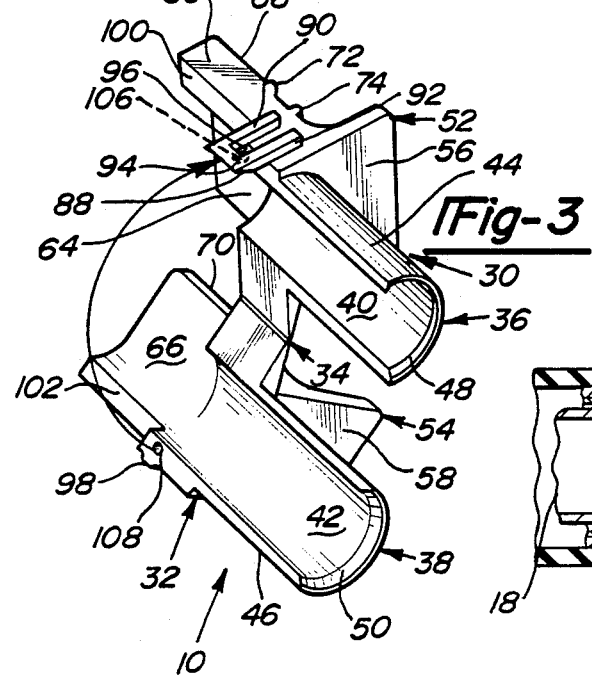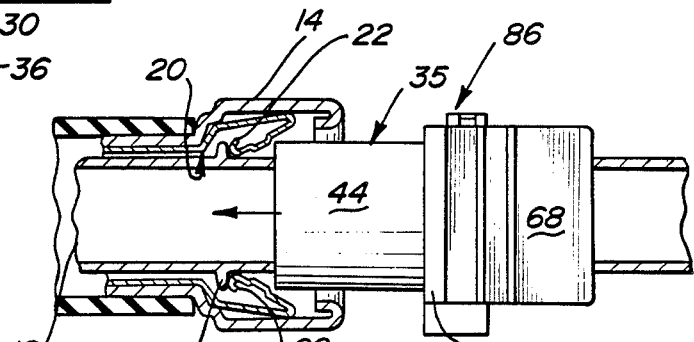

RELEASE TOOL FOR FLUID QUICK CONNECTORS

BACKGROUND OF THE INVENTION

The present invention relates to release tools and, more particularly, to conduit connector release tools which open a retainer in the female fitting enabling withdraw of the male fitting.

In the quick connector field, it is desirous in some applications to have a non-accessible retainer within the female fitting. In this type of application, a male fitting including a conduit is secured by the retainer within the female fitting. Since the retainer is non-accessible, a tool is needed to open the retainer to remove the male fitting from the female fitting.

A tool useful in the release of the male fitting from the female fitting would be adaptable to position about the periphery of the male fitting. The tool would be adaptable to removably lock about the periphery of the male fitting. Also, the tool would be manipulable by an operator to easily remove the male fitting from the female fitting. The tool would be manufactured from a lightweight, relatively inexpensive material. Accordingly, the present invention provides the art with a desired connector release tool having desirable characteristics.

From the subsequent detailed description of the preferred embodiment, taken in conjunction with the appended claims and drawings, other objects and advantages of the present invention will become apparent to those skilled in the art.

BRIEF DESCRIPTION OF THE DRAWINGS

FIG. 1 is a perspective view of a release tool in accordance with the present invention coupled with a connector assembly.

FIG. 2 is a perspective view partially in cross-section of a release tool in accordance with the present invention coupled with a connector assembly.

FIG. 3 is a perspective view of a release tool in accordance with the present invention in an uncoupled state.

FIG. 4 is a side elevation view partially in cross-section of a release tool on a conduit assembly prior to release.

FIG. 5 is a side elevation view partially in cross-section of a release tool on a conduit assembly at release.

DETAILED DESCRIPTION OF THE PREFERRED EMBODIMENT

Turning to the figures, particularly FIGS. 1 and 2, a release tool is shown and designated with the reference numeral 10. The release tool is illustrated positioned about the periphery of a male fitting conduit 12. The male fitting conduit 12 is coupled with a female fitting connector 14. The male fitting conduit 12 has a radially extending peripheral abutment 16 positioned a desired distance from the end 18 of the male fitting conduit 12. The male fitting conduit 12 is retained and locked within the female fitting connector 14 by the coupling of the retaining member 20 and abutment 16 as best seen in FIGS. 2 and 4. The retaining member 20 has a plurality of fingers 22 which encircles the abutment to securely retain the male fitting conduit 12 in the female fitting connector 14.

Turning to FIG. 3, the release tool 10 is illustrated in an open position. The release tool 10 is comprised of a pair of substantially similar half members 30 and 32. The members 30 and 32 are connected to one another by a hinge mechanism 34. The hinge mechanism 34 is preferably a live hinge enabling the members 30 and 32 to be coupled with and move with respect to one another. Also, the live hinge 34 enables the tool to be molded as a unitary structure.

Each member 30 and 32 include an arcuate portion 36 and 38. The arcuate portions 36 and 38 have concave interior surfaces 40 and 42 and convex exterior surfaces 44 and 46. When the two half members 30 and 32 are secured together, the arcuate portions 36 and 38 form a substantially cylindrical member 35. The arcuate portions 36 and 38 include chamfers 48 and 50 at their ends. The chamfers 48 and 50 provide abutment of the cylindrical member 35 with the abutment 16 so that the periphery of cylinder member 35 is substantially flush with the periphery of the abutment 16 to enable the fingers 22 to release from the abutment 16 as seen in FIG. 5.

Backstops 52 and 54 are positioned a desired distance from the chamfered ends 48 and 50 of the arcuate portions 36 and 38. The backstops 52 and 54 project radially from the arcuate portions 36 and 38. The backstops 52 and 54 include a planar surface 56 and 58.

Gripping portions 60 and 62 are positioned adjacent to the backstops 52 and 54. The gripping portions 60 and 62 are positioned substantially transverse to the backstops 52 and 54. The gripping portions 60 and 62 include an arcuate interior surface 64 and 66 which is continuous with a portion of the arc of the concave interior surfaces 40 and 42. The exterior surface 68 and 70 of the gripping portions 60 and 62 are substantially planar. A pair of nubs 72, 74, 76 and 78 project from each of the planar surfaces 68 and 70. The nubs 72–78 provide a surface for manual gripping of the tool lye an operator.

The gripping portions 60 and 62 also include a planar top surfaces 80 and 82 transverse to the exterior surfaces 68 and 70. The top surfaces 80 and 82 are separated by a gap 84. The top surfaces 80 and 82 include a mechanism 86 for releasably locking the two half members 30 and 32 together.

One top surface includes a L;-shaped member 86. The U-shaped member 86 has a pair of legs 90 and 92 separated by a web 94. The legs 90 and 92 are secured at their free ends to the planar surface 80. A rectangular aperture 96 is formed between the top surface 80, legs 90 and 92 and web 94. The web 94 includes an angular side surface 88.

The other planar surface 82 includes a rectangular post 98 projecting therefrom. The rectangular post 98 snap-fits into the rectangular aperture 96 to enable the locking together of the post 98 and U-shaped clasp member. 86. The angled surface 88 contact the post 98 enabling the U-shaped member 86 to move upward relative to the post 98 to enable the web 94 of the U-shaped member 86 to pass over the post 98. The U-shaped member 86 resiliently springs down relative to the post 98 onto the post 98 to lock together the two half members 30 and 32 as best seen in FIGS. 1 and 2.

The side edges 100 and 102 of the half members 30 and 32 include a post 106 and an aperture 108. The post 106 projects into the aperture 108 to prohibit longitudinal movement of the non-hinged side of the half members 30 and 32 when the half members 30 and 32 are coupled together.

Ordinarily, the release tool 10 operates as follows. The release tool 10 is positioned onto a male fitting conduit 12 and lock thereon by the mechanism 86. The cylindrical portion 35 is about the periphery of the male fitting conduit 12 as seen in FIG. 4. The cylindrical portion 35 is moved into the female fitting connector 14 to expand the fingers 22 of the retainer 20. As the fingers 22 expand, the chamfered ends 48 and 50 contact the abutment 16. At this time, the concave exterior surfaces 40 and 42 are substantially flush with the abutment 16. With the cylindrical portion 35 against the abutment 16 and the fingers 22 opened, the male fitting conduit 12 is able to be withdrawn from the retainer 20 and thus, withdrawn from the connector 14 taking release tool 10 with it.

While the above detailed description describes the preferred embodiment of the present invention, it will be understood, that the invention is susceptible to modification, variation, and alteration without deviating from the scope and fair meaning of the subjoined claims.

What is claimed is:

1. A connector release tool for releasing a male fitting conduit from a female fitting connector coupled together by a retaining mechanism comprising:
   means adapted for positioning about a peripheral surface of a male fitting conduit or the like, said positioning means comprised of a pair of integral members movable with respect to one another for positioning peripherally about the male fitting conduit or the like, said integral member having a smooth arcuate interior surface corresponding to an exterior surface of the male fitting, and a convex exterior surface such that when said pair of integral members are coupled together opposing one another they form a cylindrical annular portion and define a central axis, said integral members each also including a planar exterior surface portion substantially continuous with said convex exterior surface portion such that said planar exterior surface portions are on opposing sides of said central axis when said integral members are coupled together;
   means for locking said members together when positioned peripherally about the male fitting conduit or the like, said locking means unitarily formed with said members;
   said cylindrical annular portion adapted for opening retaining mechanisms retaining the male fitting conduit in a female fitting connector by inserting into the female fitting and spreading the retaining mechanisms; and
   means for enabling gripping of the tool for enabling insertion of the tool into the female fitting for manual release of the male fitting conduit from the female fitting connector, said gripping means unitarily formed with said planar exterior surfaces.

2. The connector release tool according to claim 1 wherein said members are connected to one another by a live hinge which enables pivotal movement of said members with respect to one another.

3. The connector release tool according to claim 1 wherein said locking means is comprised of releasable clasp enabling said members to be locked together with one another to form a cylindrical member and released from one another.

4. In combination, a connector release tool and a conduit assembly comprising:
   a male fitting conduit having an exterior peripheral surface and a radial peripheral abutment extending therefrom near one of its ends;
   a female fitting connector for coupling said conduit, said female fitting connector including a retaining means adapted to couple with said male fitting conduit abutment for lockingly retaining said male fitting conduit within said female fitting connector; and
   said tool comprising:
   means adapted for positioning about said male fitting conduit peripheral surface, said positioning means comprised of a pair of integral members movable with respect to one another for positioning peripherally about said male fitting conduit peripheral surface, said integral member having a smooth arcuate interior surface corresponding to an exterior surface of said pair of the male fitting, and a convex exterior surface such that when said pair of integral members are coupled together opposing one another they form a cylindrical annular portion and define a central axis, said integral members each also including a planar exterior surface portion substantially continuous with said convex exterior surface portion such that said planar exterior surface portions are on opposing sides of said central axis when said integral members are coupled together;
   means for locking said members together when positioned peripherally about the male fitting conduit peripheral surface, said locking means unitarily formed with said positioning means;
   said cylindrical annular portion adapted for opening said housing retaining means by inserting into said female fitting and spreading said retaining means; and
   means for enabling gripping of the tool for enabling insertion of the tool into the female fitting for manual release oft he male fitting conduit abutment from said housing retaining means, said gripping means unitarily formed with said planar exterior surfaces.

5. The combination according to claim 4 wherein said members are connected to one another by a unitary live hinge which enables pivotal movement of said members with respect to one another.

6. The combination according to claim 4 wherein said locking means is comprised of releasable clasp enabling said members to be locked with one another.

7. A connector release tool for releasing a male fitting conduit from a female fitting connector coupled together by a retaining mechanism comprising:
   a pair of substantially identical members connected with one another such that said members are movable with respect to one another, said members each including a portion having a concave arcuate interior surface and a convex exterior surface such that when the pair of members are coupled together opposing one another they form a cylindrical portion and define a central axis, each of said members also including a planar exterior surface portion substantially continuous with said convex exterior surface portion such that said planar exterior surface portions are on opposing sides of said central axis when said members are coupled together, said planar exterior surfaces including a gripping means for enabling manual manipulation; and
   a clasp mechanism coupled with said members for releasably locking said members together when in said cylindrical position.

8. The connector release tool according to claim 7 further comprising a live hinge between said members for providing movement of said members with respect to one another.

9. The connector release tool according to claim 7 wherein said clasp means is further comprised of a U-shaped member having a pair of legs connected by a web extending from one of said pair of members, a rectangular post extending from the other of said pair of members adapted to be received by said U-shaped member for coupling said pair of members together.

10. The connector release tool according to claim 9 wherein said clasp means further comprising a pin extending from an edge of one of said members and a corresponding aperture on an edge of said other member adapted to receive said pin for positioning said pair of members with respect to one another in said locked position.

11. The connector release tool according to claim 7 further comprising a stop member projecting radially from the exterior surface of said members at the junction of said planar portion and convex portion.

12. The connector release tool according to claim 7 wherein said concave arcuate surfaces include a chamfered surface at their ends.

* * * * *